(12) United States Patent
Xie et al.

(10) Patent No.: US 11,604,070 B2
(45) Date of Patent: Mar. 14, 2023

(54) MAP MAINTENANCE AND VERIFICATION

(71) Applicant: GM Cruise Holdings LLC, San Francisco, CA (US)

(72) Inventors: Chen Xie, San Francisco, CA (US); Matthew Fox, San Francisco, CA (US); Brian Joseph Donohue, San Francisco, CA (US); Kangyuan Niu, Northridge, CA (US); Katherine Leung, Milpitas, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 332 days.

(21) Appl. No.: 16/836,799

(22) Filed: Mar. 31, 2020

(65) Prior Publication Data

US 2021/0302170 A1  Sep. 30, 2021

(51) Int. Cl.
*G06F 16/00* (2019.01)
*G01C 21/32* (2006.01)
*G06F 16/23* (2019.01)
*G06F 16/29* (2019.01)

(52) U.S. Cl.
CPC ............. *G01C 21/32* (2013.01); *G06F 16/23* (2019.01); *G06F 16/29* (2019.01)

(58) Field of Classification Search
CPC .......... G01C 21/32; G06F 16/23; G06F 16/29
See application file for complete search history.

(56) References Cited

U.S. PATENT DOCUMENTS

| | | | |
|---|---|---|---|
| 2018/0188037 A1* | 7/2018 | Wheeler | G08G 1/096827 |
| 2018/0307930 A1* | 10/2018 | Mittal | G06V 20/588 |
| 2019/0220036 A1 | 7/2019 | Weslosky et al. | |
| 2020/0011684 A1* | 1/2020 | McErlain, II | G01C 21/20 |
| 2020/0400441 A1 | 12/2020 | Efland | |

* cited by examiner

*Primary Examiner* — Dinku W Gebresenbet
(74) *Attorney, Agent, or Firm* — Polsinelli PC

(57) ABSTRACT

Techniques are disclosed for evaluating digital map quality. A process includes steps for receiving change data indicating one or more feature discrepancies associated with one or more geographic regions of a digital map, analyzing the change data to determine which of the one or more feature discrepancies resulted in verified updates to the digital map, and generating a quality score for each of the geographic map regions based on the verified updates. Systems and machine-readable media are also provided.

20 Claims, 10 Drawing Sheets

MAP MAINTENANCE AND VERIFICATION

BACKGROUND

1. Technical Field

The subject technology relates to solutions for evaluating map quality and in particular, or determining map precision, accuracy, and recall in order to facilitate the management of an end-to-end map maintenance process.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
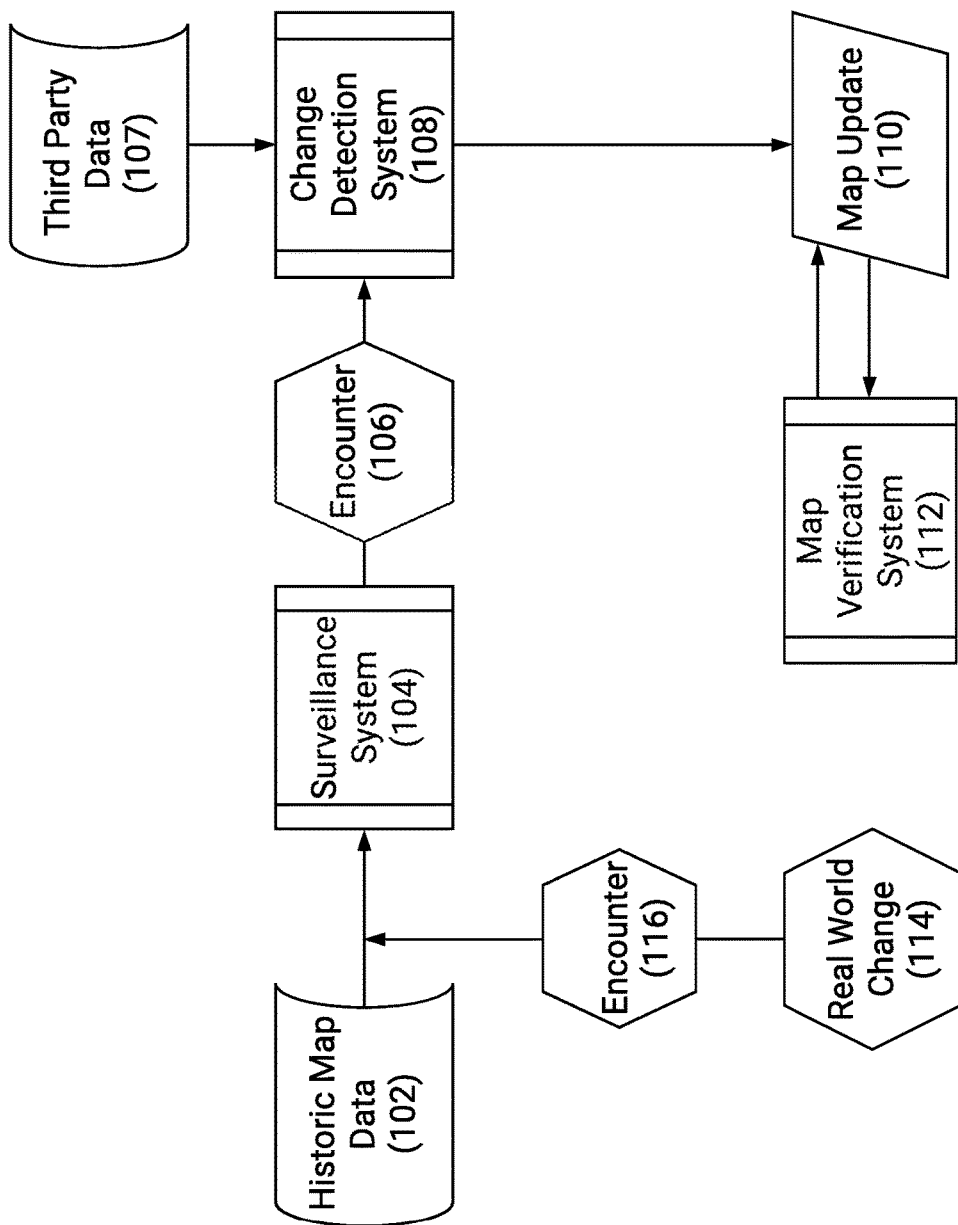
FIG. 1 conceptually illustrates an example map maintenance system that includes a surveillance system, a change detection system, and a map verification system, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The successful implementation of autonomous vehicle (AV) technologies depends on the ability to generate and continuously update high-accuracy maps of the geographic regions in which AVs are deployed. System-level verification testing, which would check that map feature accuracy and quality is met with each map version, is too onerous and expensive to be implemented on an ongoing basis.

Aspects of the disclosed technology provide solutions to conventional process validation techniques by providing systems and methods for intelligently identifying data collection needs, implementing data collection (surveillance) tasks, and evaluating map quality and accuracy.

Map Surveillance System

In some aspects, the disclosed technology relates to a map surveillance system that is configured to maintain map data accuracy to ensure compliance with map accuracy standards, for example, that may be set by service level agreements (SLAs), or other quality guarantees. In some embodiments, the map surveillance system determines necessary data collection (surveillance) intervals that are needed to ensure data accuracy across different geographic regions, and for different map feature types. As discussed in further detail below, a map surveillance system of the disclosed technology can utilize dynamic statistical models to determine data accuracy thresholds for various map attributes, including various map features for specific geographic regions, as well as to predict feature accuracy for geographic regions in which data collection is sparse.

Change Detection System

In another aspect, the disclosed technology relates to a change detection platform that is configured to manage change detection signals by modulating between high-quality and low-quality signals on a per-region basis. In some embodiments, the change detection platform can manage change detection signals as a function of signal source. For example, the change detection platform can predict accuracy and/or relevance of data received from various map change data sources, including but not limited to: human operators, online change detectors, offline change detectors, and/or third-party data streams, etc. As discussed in further detail below, the disclosed change detection system can calculate highly granular map change data for a given geographic region (or an entire map, for example, by predicting accuracy, precision, and/or recall statistics for different map feature types.

Map Maintenance and Verification Platform

In yet another aspect, the disclosed technology encompasses a map maintenance and verification platform that is configured to assess map quality. In some aspects, the verification platform can be configured to calculate quality (accuracy) scores for one or more individual geographic regions. In other aspects, the verification platform can be configured to provide quality (accuracy) assessments for an entire map. As discussed in further detail below, map quality metrics may be subdivided based on geographic region and/or based on feature type.

End-to-End Map Maintenance System Overview

FIG. 1 conceptually illustrates an example of an end-to-end map maintenance system 100 that includes a surveillance system 104, a change detection system 108, and a map verification system 112, according to some aspects of the disclosed technology. As illustrated in FIG. 1, surveillance system 104 is configured to receive historic map data 102, which can encompass any information regarding map features or other ground-truth characteristics. Historic map data 102 can include map data from a variety of sources, including data collected by one or more AV sensor systems (e.g., AV observations), third-party data (such as government data), and/or human generated data. Data can include encounters 116 by the variety of sources, including real world changes 114. Historic map data 102 ideally contains information indicating changes to map features or characteristics of a defined time period. As used herein, map features can include virtually any map characteristic, including but not limited to: road signs (e.g., stop signs, speed signs, yield signs, etc.), traffic lights, hazard lights, boundary lines (e.g., lane boundaries, crosswalks, bike lane demarcations, etc.), parking indicia (e.g., space boundaries), and the like.

Changes indicated by historic map data 102 can include the addition of new features, the removal of (previously) existing features, and/or changes to a feature, such as changes to the location of a sign or boundary line. In some aspects, surveillance system 104 can be configured to calculate a change rate with respect to each feature type; additionally, feature changes can be grouped, for example, with respect to a specified geographic region. That is, various geographic subsets of the map may correspond with different change rates for different features. As discussed in further detail below with respect to FIGS. 3 and 4, feature change rates can provide data from which a data collection (surveillance) task cadence can be determined. For example, surveillance system 104 can determine a surveillance cadence for different geographic regions based on measures of corresponding feature change rate, as well as feature importance and/or data collection costs. As such, surveillance system 104 can manage the generation of surveillance (data collection) tasks that cause AV data collection to occur with respect to a specific geographic region and/or feature type.

As illustrated, surveillance tasks generated by surveillance system 104 result in (AV) encounters 106 when one or more AVs are sent to retrieve data from the relevant location/s. Encounters 106 can result in any type of updated ground-truth data, including AV sensor data, and/or AV operator data. Additionally, change detection system 108 can be configured to receive third-party data 107 (e.g., government data), that may indicate ground-truth changes that need to be committed to a given area map. Encounter data 106, and third-party data 107 can be received by change detection system 108. Change detection system 108 can be configured to manage all received change detection signals, and to modulate between low-quality and high-quality signals. As discussed in further detail below with respect to FIGS. 5 and 6, change detection system 108 prioritizes map change data based on change-signal relevance, including by determining relevance statistics relating to accuracy, precision, and recall for different feature types, and across different change signal sources. The highest priority and/or quality change signals identified by change detection system 108 are then validated and committed to a map update 110.

In some aspects, a map verification system 112 can be used to measure map quality. For example, map verification system 112 can be configured to compute quality (accuracy) score measures for one or more individual geographic regions of the map and/or to determine an overall accuracy score of the entire map. Map quality metrics calculated by map verification system 112 may be based on comparisons to map change data and actual changes that are ultimately implemented in map update 110. As such, quality metrics can be highly granular, and computed in relation to a specific feature type, specific geographic region, or for a time-period. As discussed in further detail below with respect to FIGS. 7 and 8, verification system 112 can perform map validation by comparing semantic labels, by comparing semantic labels with images, and/or by comparing semantic labels with LiDAR point cloud data, etc.

Figure 2:
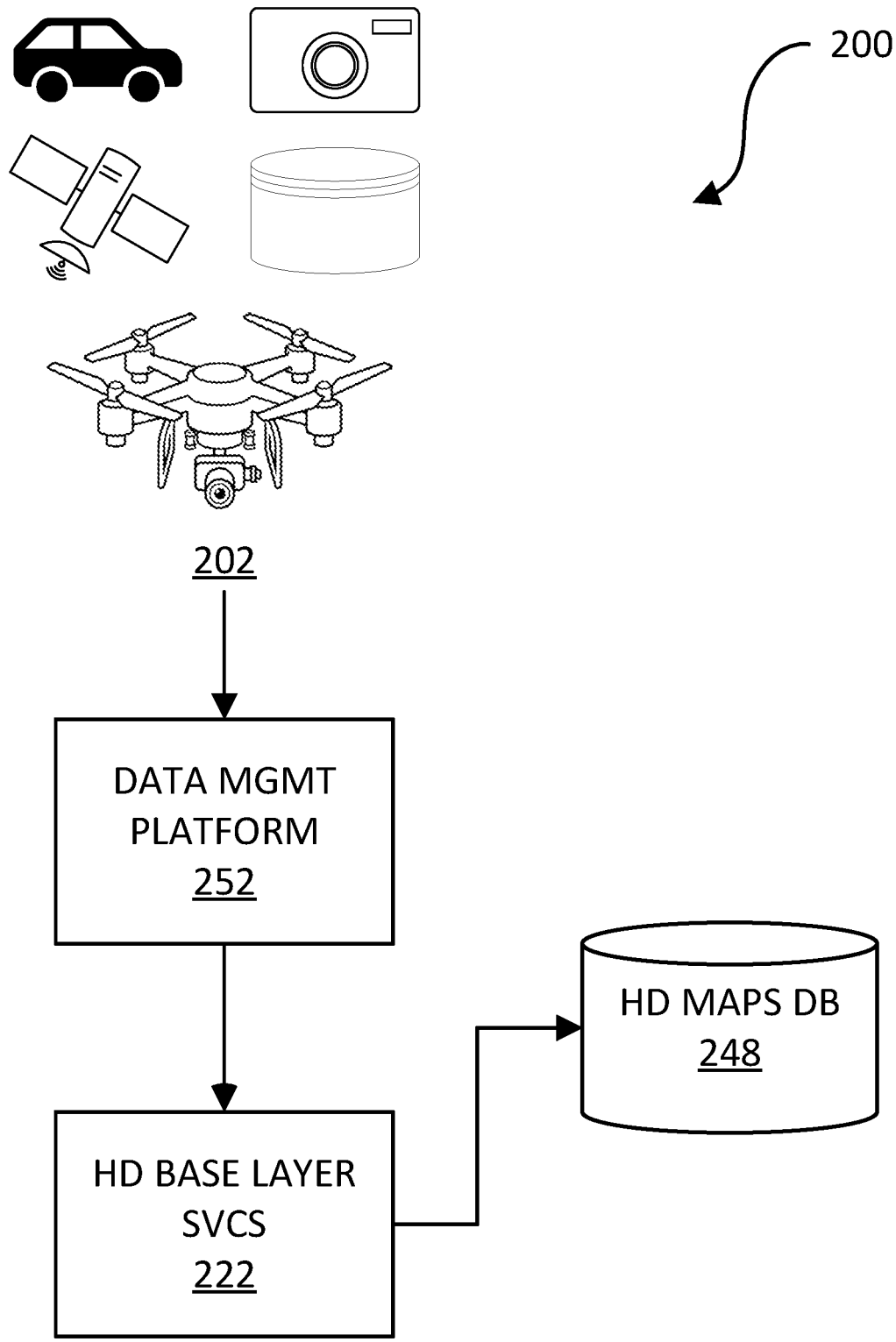
FIG. 2 illustrates an example system for generating and labeling High-Definition (HD) maps for AVs in accordance with some aspects of the disclosed technology.

FIG. 2 illustrates an example of a system diagram 200 for generating HD maps for AVs. One of ordinary skill will understood that, for any flow, component, database, or service discussed herein, there can be additional, fewer, or alternative flows, components, databases, or services within the scope of the various embodiments unless otherwise stated. Additionally, some sub-services can be distributed amongst two or more services, systems, or components. Additionally, the databases shown herein are for illustrative purposes only and the data described as being stored therein may be stored in more or less databases and even the distinct databases shown can be combined.

The system diagram 200 first shows raw data captured by data sources 202, which can include one or more vehicles, AVs, satellites, UAVs, standalone sensors, third-party databases, and/or other sources of geospatial data. As discussed, AVs can include one or more IMUs, cameras, LIDAR systems, RADAR systems, GPS receivers, ultrasonic sensors, odometers, and so on. In some embodiments, one or more AVs can capture raw sensor data from a particular geographic region and upload it to a data management platform, such as a data management platform 952, discussed in relation to FIG. 9, below. For example, the AVs can be dedicated HD mapping vehicles specifically assigned to capture the raw sensor data, AVs operating as part of a ridesharing service or other AV-related service in the ordinary course of transit, third-party AVs provisioned for its raw sensor data, and so on. In other embodiments, the AVs may perform some preprocessing of raw sensor data and upload the preprocessed results to the data management platform. For instance, the AVs can use sensor fusion and/or Simultaneous Localization and Mapping (SLAM) techniques for determining position information.

In some embodiments, the AVs can determine initial estimates of their displacement within a fixed amount of time using odometry and IMU data. The AVs can utilize GPS data, LIDAR data, image data, ultrasonic data, and/or other sensor data to minimize errors associated with the initial pose predictions. Then, the AVs can associate 3D image scans, 3D LIDAR point cloud scans, or other scans with positions and orientations, and upload the scans and associated pose information to the data management platform 252, which can be the data management platform 952 of FIG. 9. In still other embodiments, the data management platform and/or other downstream systems (e.g., HD base layer services 222, mapping operations services 224, etc.) can process raw sensor data captured by the data sources 202 and/or preprocessed data generated by the data sources. Various combinations of these approaches may be utilized depending on the computing resources (e.g., processing, memory, storage, network bandwidth, etc.) available to the data sources 202, the data management platform, and/or other downstream system. For example, an AV may transmit raw sensor data in real-time to the data management platform when there is high network bandwidth available; the AV may store raw sensor data when network bandwidth is limited and upload or offload the stored sensor data at a later time; the AV may preprocess raw sensor data to generate a more compressed form when the AV is low on storage and network bandwidth is limited; and so on.

System 200 can continue with the HD base layer services 222 receiving sensor data (and/or preprocessed data) from the data management platform and generating base representations of AV geospatial data. In some embodiments, the base representations can comprise HD map tiles. For example, the HD base layer services 222 can obtain a 3D LIDAR point cloud scan, including range and surface reflectance data, and corresponding pose information for the scan. Then, the HD base layer services 222 can project the scan onto a 2D grid in which rows and columns can represent x-y positions and cell values can encode surface reflectance, height, associated statistical values (e.g., mean, mode, median, standard deviation, variance, etc.), and so on. The HD base layer services 222 can send the base representations to HD maps database 248 for storage. HD maps database 248 can be map database 508, 708 and/or include historic map data 102, 302.

Figure 3:
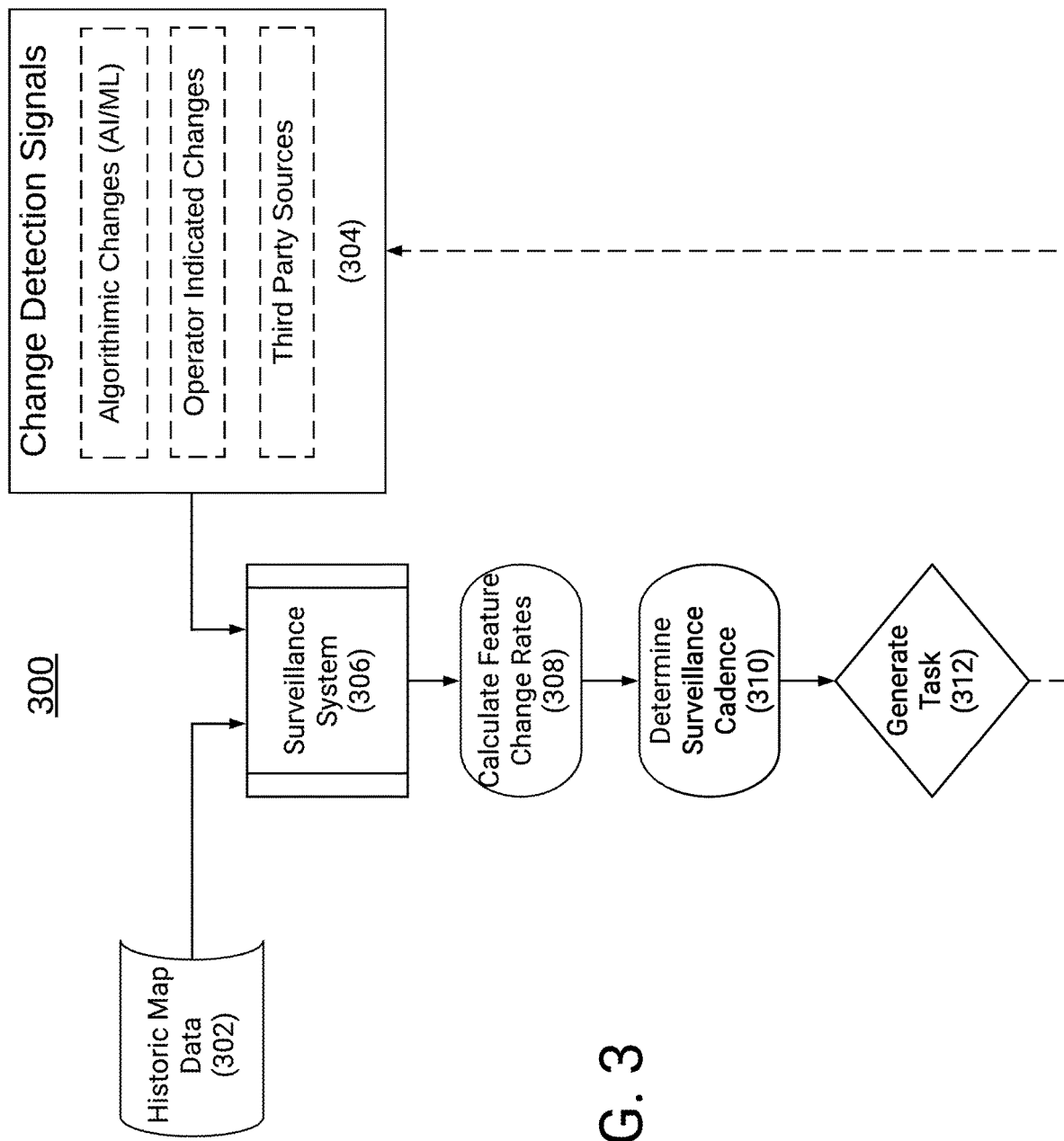
FIG. 3 illustrates a schematic block diagram of an example surveillance system that can be configured to determine a data collection cadence necessary to maintain map accuracy requirements, according to some aspects of the disclosed technology.

FIG. 3 illustrates a schematic block diagram of an example surveillance system 306 that can be configured to determine a data collection cadence necessary to maintain map accuracy requirements. Surveillance system 306 is configured to initially receive historic map data 302 from which initial feature change rates 308 can be calculated. In some approaches, feature change rates can be initially calculated based on feature changes logged in the historic map database 302 during a predetermined time range. By way of example, changes to stop signs (e.g., additions, removals and location changes) may be determined from one or more specific geographic subsets (regions) of a digital map. In some aspects, feature accuracy estimates can be time dependent, for example, wherein accuracy is estimated using a decay model in which accuracy is assumed to decrease as time between feature measurements increases. By way of example, initial feature accuracy change rates can be defined using a Poisson distribution decay model. However, other initial decay modeling approaches may be used, without departing from the scope of the disclosed technology.

As change detection signals are updated, accuracy estimates (and decay modeling) for one or more features across various geographic regions can also be updated. As illustrated, change rates 308 can be re-calculated (updated) based on subsequent change detection signals 304, which can include change data aggregated across a variety of signals. Such signals can include, but are not limited to, algorithmic changes, operator indicated changes, and/or third-party sources. Additionally, it is understood that any of the change detection signals 304 can provide detected changes that are served using on-line (e.g., near real-time) data collection (e.g., from an AV or AV operator), or that are sourced from offline change detectors or map change databases.

Feature change rates calculated by surveillance system 306 can be used to determine a surveillance cadence 310, which defines a periodicity with which data for a particular geographic region (e.g., a map mini-section), needs to be collected. Cadence rates can be further based on thresholds for accuracy requirements, for example, that are specified by Service Level Agreements (SLAs). By way of example, specific accuracy requirements may be set for a particular feature type (e.g., stop lights), or for a particular geographic region, such as the SoMa (South of Market) neighborhood in a particular city, such as San Francisco.

In some approaches, surveillance system 306 can generate or prioritize surveillance tasks 312 based on the surveillance cadence 310. For example, surveillance tasks 312 can be tickets or other workflow process items that cause the collection of data, either by AVs, for example, by routing AV's to a particular area to perform sensor data collection, or by requesting operator indicated map changes from offline-workflows. That is, generated tasks 312 can ultimately result in the generation of additional change signals 304 (e.g., updated map data) that are received by surveillance system 306.

Figure 4:
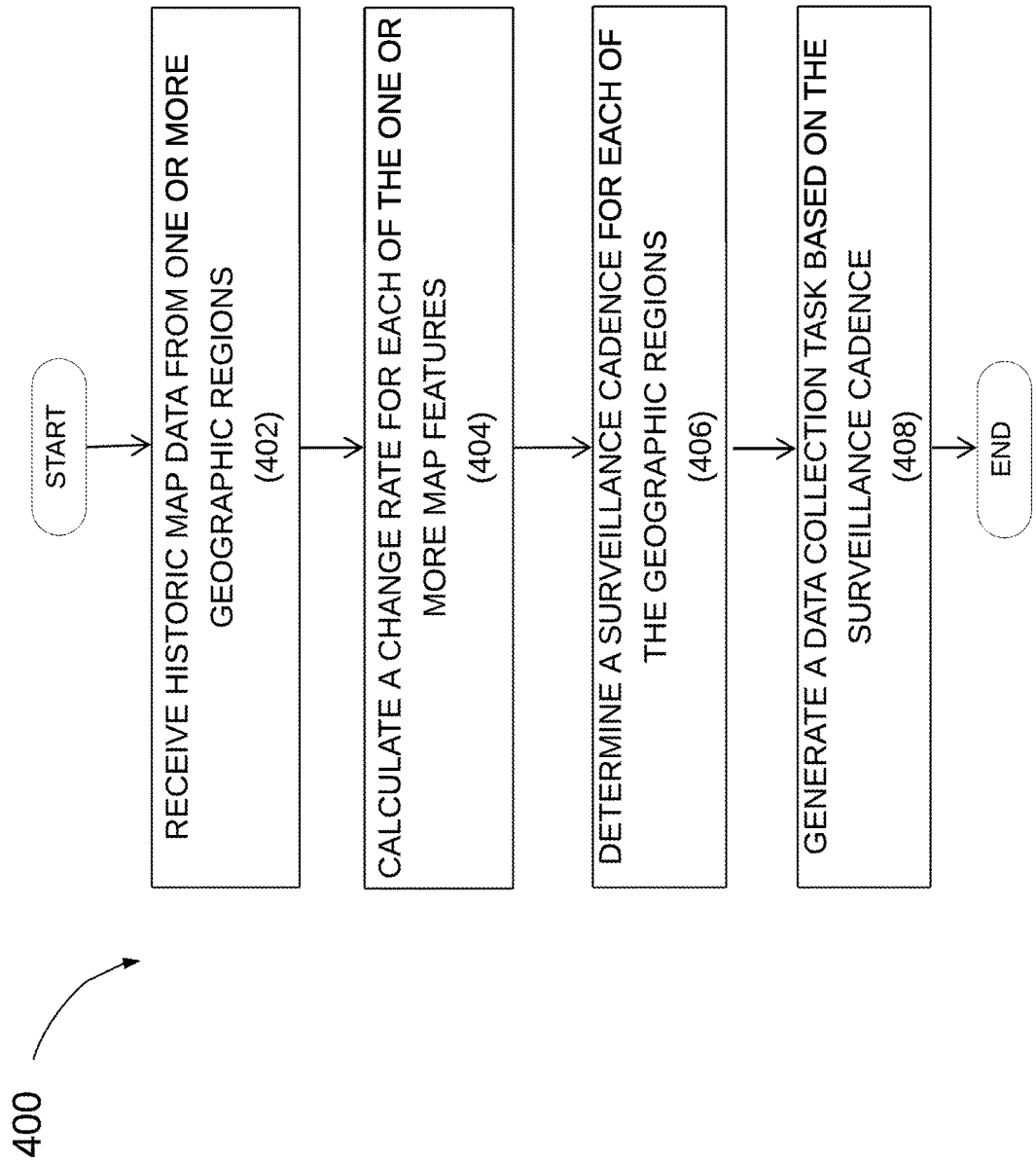
FIG. 4 illustrates an example process for implementing a surveillance system, according to some aspects of the disclosed technology.

FIG. 4 illustrates an example process 400 for implementing a surveillance system, according to some aspects of the disclosed technology. Process 400 begins with step 402 in which historic map data is received, e.g., at a surveillance system or module, as discussed above with respect to FIG. 3. The historic map data can contain information regarding one or more map features for one or more geographic areas (subsets) of a digital map. By way of example, historic map data may contain information detailing changes to all bike lane demarcation lines for the city of San Francisco over a five-year period.

In step 404, a change rate is calculated for one or more map features using the historic map data. Further to the above example, change rates with respect to a particular feature (e.g., bike lane demarcation lines) may be calculated across various geographic regions in San Francisco. In some instances, change rates may by associated with a particular geographic region. For example, change rates for bike lane demarcation lines may be independently calculated for the SoMa and FiDi (Financial District) areas of San Francisco.

In step 406, a surveillance cadence is computed. In some implementations, surveillance cadences are computed with respect to a specific geographic region. For example, the surveillance cadence for SoMa may be different from that of FiDi, for example, due to different change rates for their respective map features. In some embodiments, surveillance cadence is selected based on the minimum periodicity that is needed to maintain an adequate update accuracy for features of a given geographic region. By way of example, if stop sign features in SoMa require updating every ten days to maintain adequate accuracy, but stop lights require an update every five days, then the surveillance cadence may be determined to be five days. As discussed above, surveillance cadence can vary between geographic areas, depending on the accuracy requirements for each area and for individual features in that area.

In step 408, one or more data collection tasks are generated based on the surveillance rate determined in step 406. In some aspects, data collection tasks (tickets) can be configured to cause an AV to be dispatched to a particular location to collect updated map (feature) data for that region. Further to the above example, if it is determined, based on the surveillance cadence for the SoMa district, that updated information is needed for stop signs, then a task may be created to send an AV to the SoMa district to collect updated sensor data. In some aspects, sensor data can include updated data for other features, e.g., such as stop signs, or traffic lights etc. As such, although a surveillance cadence may be determined by the need to update data for a particular feature type, updated feature data for other feature types can be collected during the same surveillance run.

Additionally, updated map data may be received from one or more AVs or from other data sources for a particular area, for example, without the need to dispatch an AV for the data collection task. That is, the surveillance system can consider updated feature data received, for example, from AVs during the course of normal ride-delivery service operations before data collection (surveillance) tasks are generated.

Figure 5:
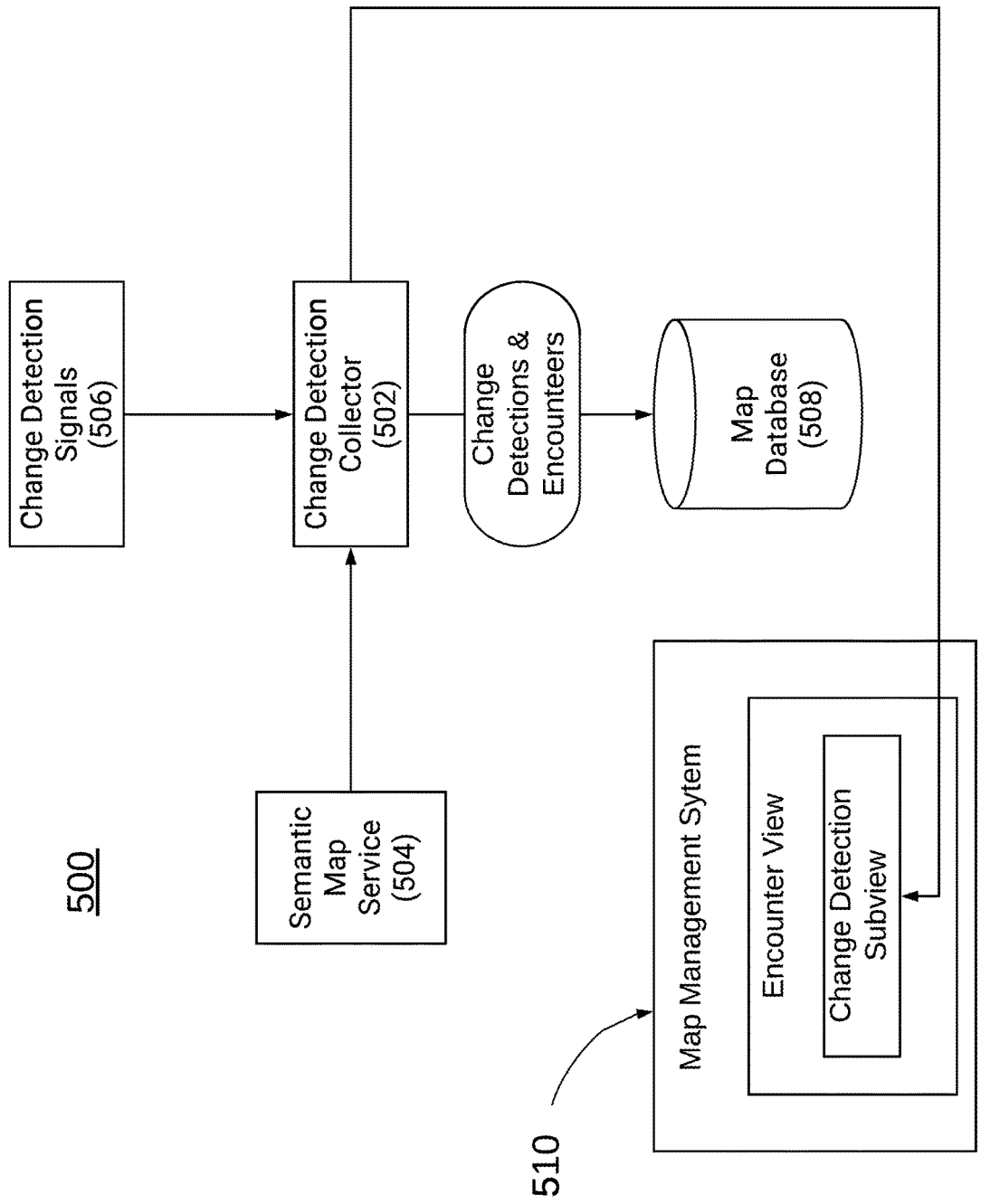
FIG. 5 illustrates a schematic block diagram of an example change detection system that can be configured to prioritize map change signals, according to some aspects of the disclosed technology.

FIG. 5 illustrates a schematic block diagram of an example change detection system 500 that can be configured to prioritize map change signals, according to some aspects of the disclosed technology. As discussed above, map change detection system 500 functions to determine change signal priority based on historical accuracy (per signal type), and to make allocation decisions in task reports e.g., to decide what signals should be reviewed, and which should not. Change signal accuracy determinations may be associated with a change detection signal source (e.g., AV operators, an online change detector, an offline-change detector, or a third-party data source). In some aspects, change signal accuracy may be further subdivided by geographic region and/or map feature type.

As illustrated, system 500 includes a change detection collector 502 that is configured to receive semantic feature labels from semantic map service 504, as well as change detection signals 506. Change detection collector 502 is configured to query map database 508, for example, to determine which change signals have the greatest accuracy. Change signal accuracy may be determined on the basis of a number of different metrics, including, but not limited to, one or more of: an accuracy score, a precision score, and a recall score. As used herein, a recall score refers to a degree to which real world objects, e.g., ground-truth map features, are accurately represented in the digital map. A precision score refers to a degree to which virtual map features are accurately represented by real-world features (e.g., ground truth features). Lastly, an accuracy score (or spatial deviation score) refers to the location accuracy of a given feature.

In practice, change detection collector 502 can receive change detection signals 506 (from one or more sources, as discussed above) and compare those indicated changes to semantic labels provided by semantic map service 504. Change detections and/or encounter information can be stored to map database 508.

As illustrated, change detection signals 506 are also provided to a map management system 510, for example, for further review via a change detection sub-view process provided by the map management system 510. The change detection sub-view provides an additional layer of (human) verification, before change detection signals are used to push map updates. In some aspects, map change decisions made at this second layer of (human) review, can be used by the change detection system to evaluate the quality of different change detection signals.

Figure 6:
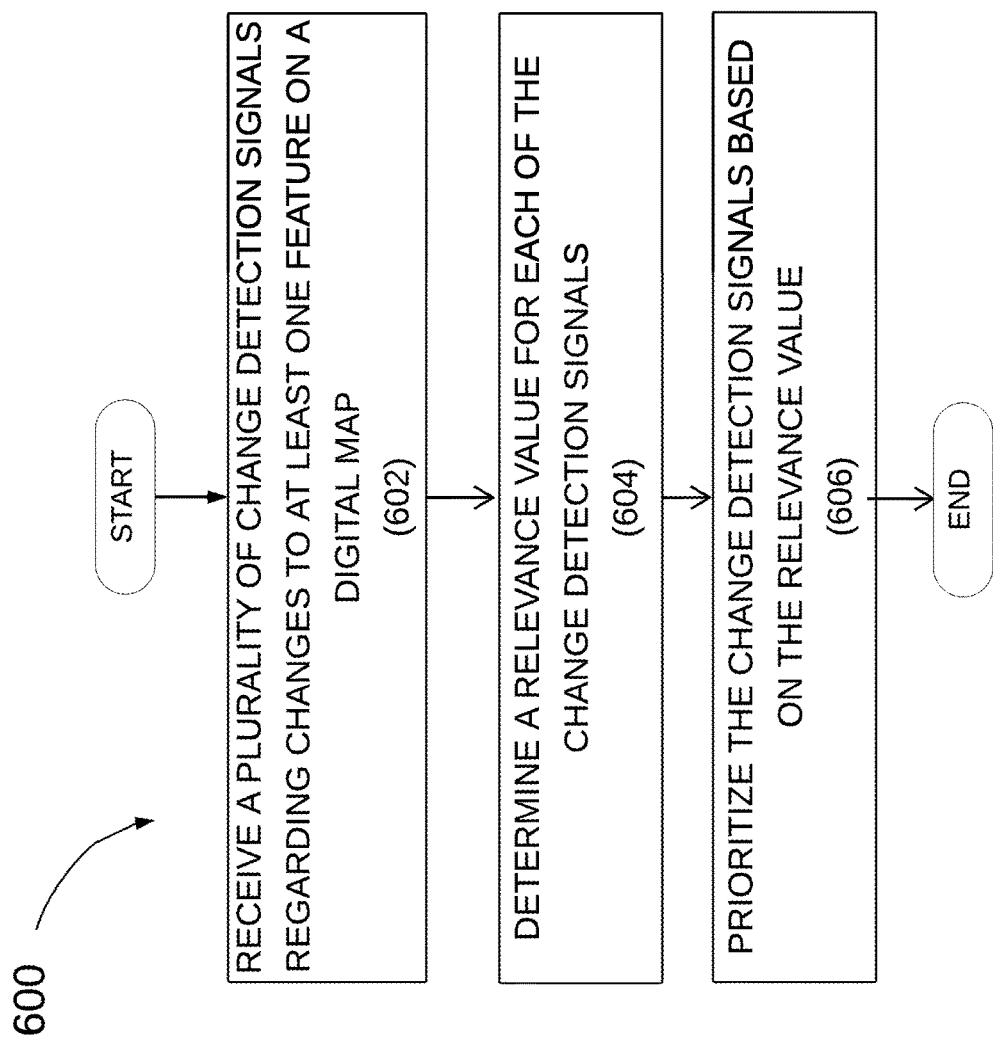
FIG. 6 illustrates an example process for implementing a change detection system, according to some aspects of the disclosed technology.

FIG. 6 illustrates an example process 600 for implementing a change detection system, according to some aspects of the disclosed technology. Process 600 begins with step 602, in which a plurality of change detection signals are received, e.g., by a change detection system/platform discussed above with respect to FIG. 5. Change detection signals can include data that indicates changes to at least one (map) feature. As discussed above, change detection signals can come from one or more sources, including but not limited to: AV operators, online-change detectors (e.g., AV sensors performing data collection services), third-party data streams (e.g., government data), and/or offline change detectors.

In step 604, a relevance value for each of the change detection signals is determined. Change signal accuracy can be evaluated based on historic information for different change signal sources. For example, if a particular source proves to be highly accurate for a given feature type, then the signal may have a high relevance value for that feature type. Alternatively, if the same source tends to have a low accuracy for a different feature type, the signal source may be deemed to be less relevant for that feature. Change detection signal relevance can also be based on geographic area, for example, certain change detection signals may be more accurate for certain geographic regions, and less accurate for others. As such, change detection signal relevance can be location based. By way of example, AV data collected for stop signs in SoMa may be deemed to be highly accurate (high relevance), however, AV collected data for stop signs may be less accurate in a different area e.g., FiDi, and in that case, deemed to be of lower relevance.

In step 606, change detection signals are prioritized based on relevance value. Change signals of high relevance can be given greater priority for a second stage of review, for example, that is performed to validate the changes before map updates are made. In some aspects, this second state of review may be performed by an automated process (e.g., using one or more algorithms), or manually, for example, using human operators. Verification of changes at this second stage of review can be used to update relevance values of various change detection signals. For example, if a highly relevant signal is discovered to contain an increasing number of errors (e.g., errors of accuracy, precision and/or recall), then the relevance (confidence) value of that change signal source may be updated (lowered) accordingly.

By properly prioritizing the relevance of multiple different change detection signal streams, the map update system can be configured to commit more relevant changes to the map, in an efficient and cost-effective manner.

Figure 7:
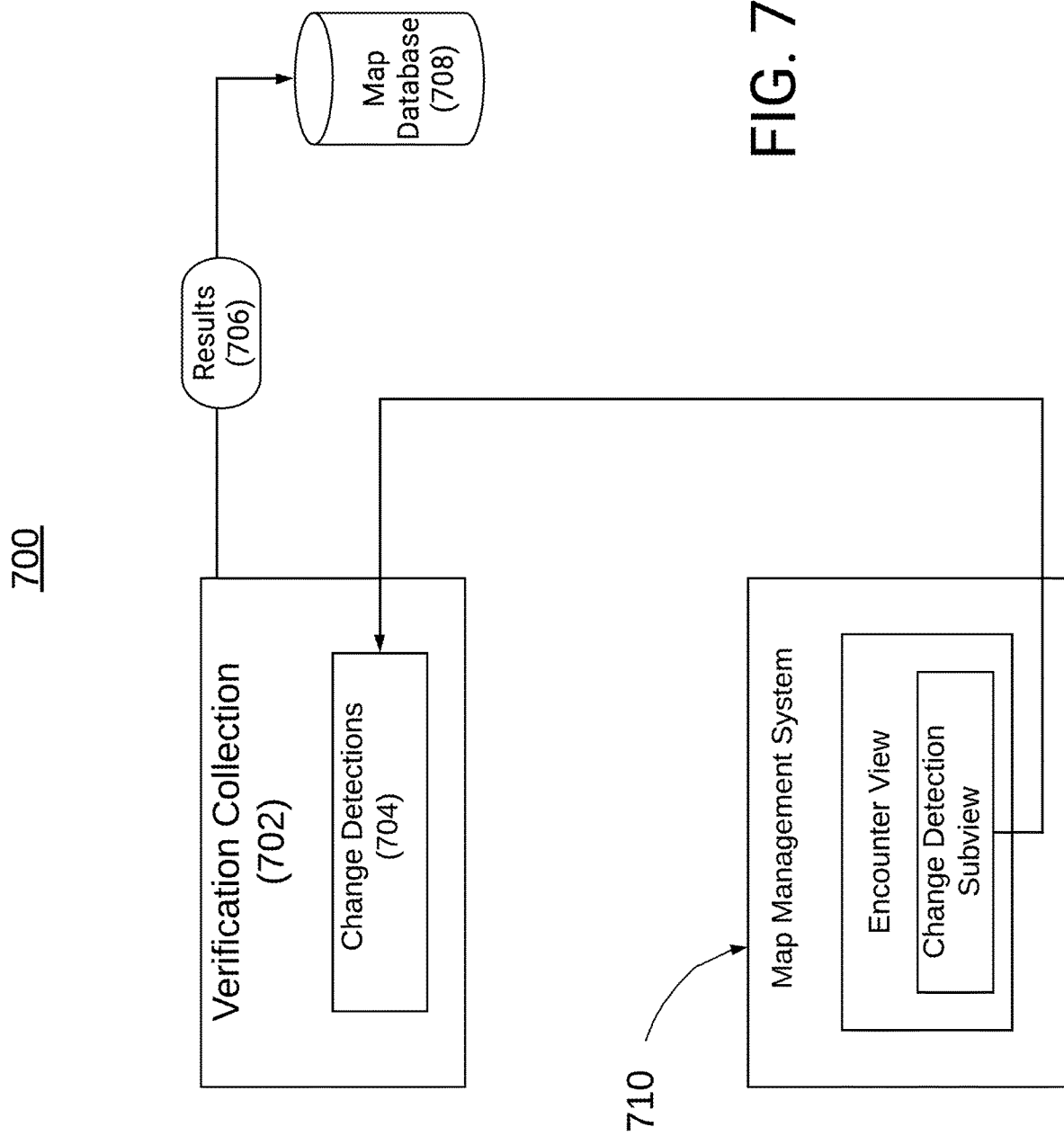
FIG. 7 illustrates a schematic block diagram of an example map verification system that is configured to determine various metrics relating to map precision, accuracy, and recall, according to some aspects of the disclosed technology.

FIG. 7 illustrates a schematic block diagram of an example map verification system 700 that is configured to determine various metrics relating to map precision, accuracy, and recall, according to some aspects of the disclosed technology. As discussed above, verification platform 700 can be configured to calculate quality (accuracy) scores for one or more individual geographic regions. Verification platform 700 can also be configured to provide quality (accuracy) assessments for an entire map. By providing a way to score map accuracy, other map maintenance parameters—such as surveillance cadence, and change detection signal priority—can be modified to ensure that map update information is adequately collected, processed, and pushed (to updates). These modifications help to ensure a level of map accuracy that is consistent with predefined exactness requirements, such as those dictated by SLAs.

Map verification system 700 includes a verification collection module 702 that is configured to receive and aggregate change detections 704 that are committed to a map update. In some aspects, change detections 704 are the results of a second layer review/validation process, for example, that is facilitated by a map management system workflow 710. Results 706 generated by verification collection 702 are then stored to a map database 708.

Figure 8:
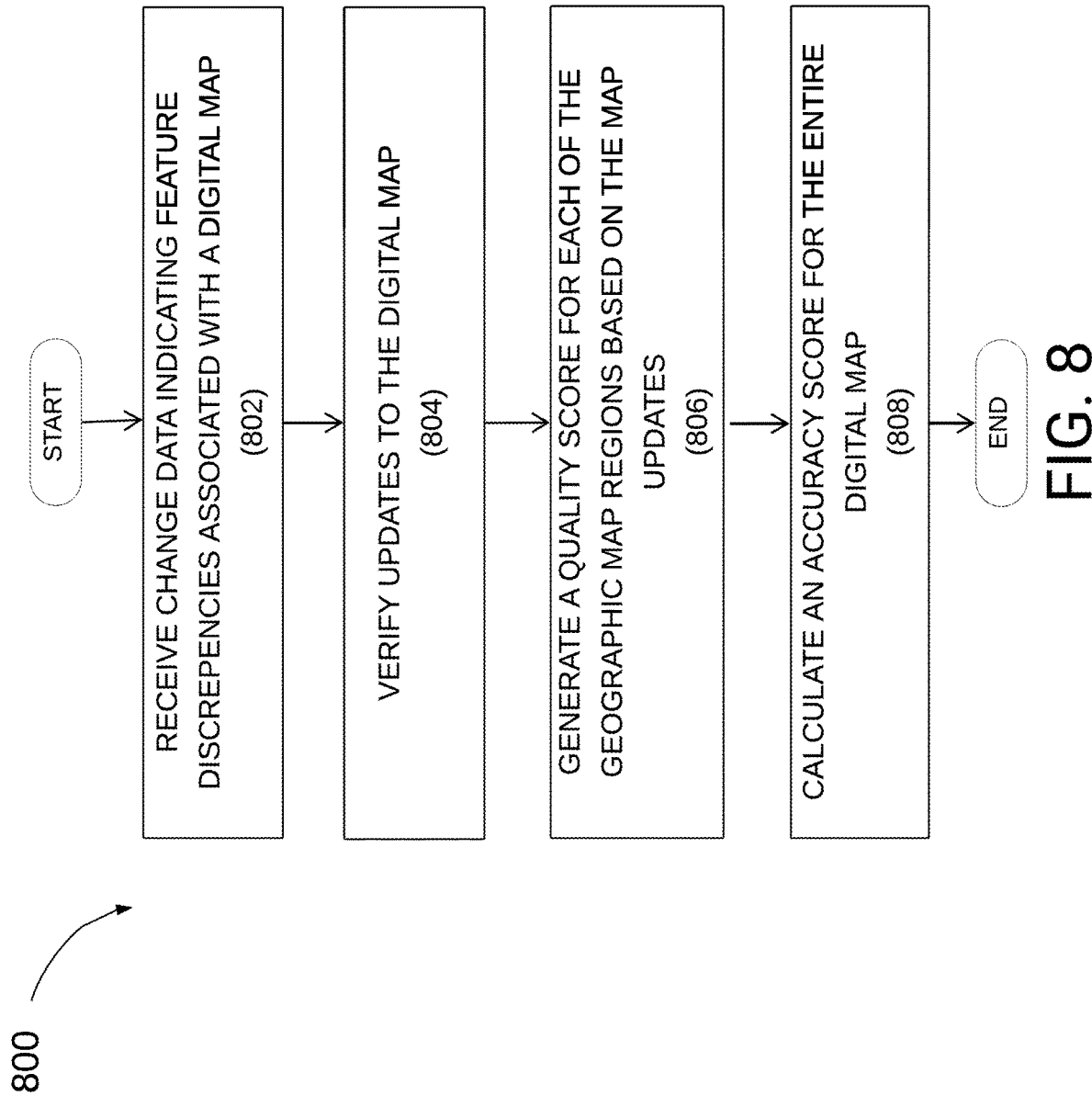
FIG. 8 illustrates steps of an example process for implementing a map verification system, according to some aspects of the disclosed technology.

FIG. 8 illustrates steps of an example process 800 for implementing a map verification system, according to some aspects of the disclosed technology. Process 800 begins with step 802, in which change data is received, for example, by a map maintenance and verification system of the disclosed technology. The change data can indicate feature discrepancies in one or more geographic regions of a digital map.

In step 804, the change data/updates are verified. In some aspects, verification of the updates requires determining which features were updated, and which changes were discarded e.g., in the second review layer. By assessing various accuracy metrics for each given map region (geographic region), such as accuracy, precision, and/or recall, statistical assessments of map quality can be made.

For example, in step 806, a quality score for each geographic region can be generated based on accuracy, precision and/or recall metrics for feature data associated with the corresponding geographic region. In some aspects, quality score metrics may be predicted for certain geographic regions for which feature change data was never received, or for which updated feature change data cannot be collected.

In step 808, an accuracy score for the entire map is calculated based on the quality scores determined for the one or more geographic regions (step 806). In some aspects, an accuracy score for the entire map can be based on predicted quality scores for one or more geographic regions. In some implementations, detected decreases in the accuracy score may drive changes to other components in the end-to-end map maintenance system. For example, decreasing accuracy may drive an increase in surveillance cadence, as managed by the surveillance system discussed above with respect to FIGS. 3 and 4. Additionally, decreases in map accuracy may precipitate updates to the manner in which change signals are prioritized for use in map updates, as managed by the map detection system discussed above with respect to FIGS. 5, and 6.

Figure 9:
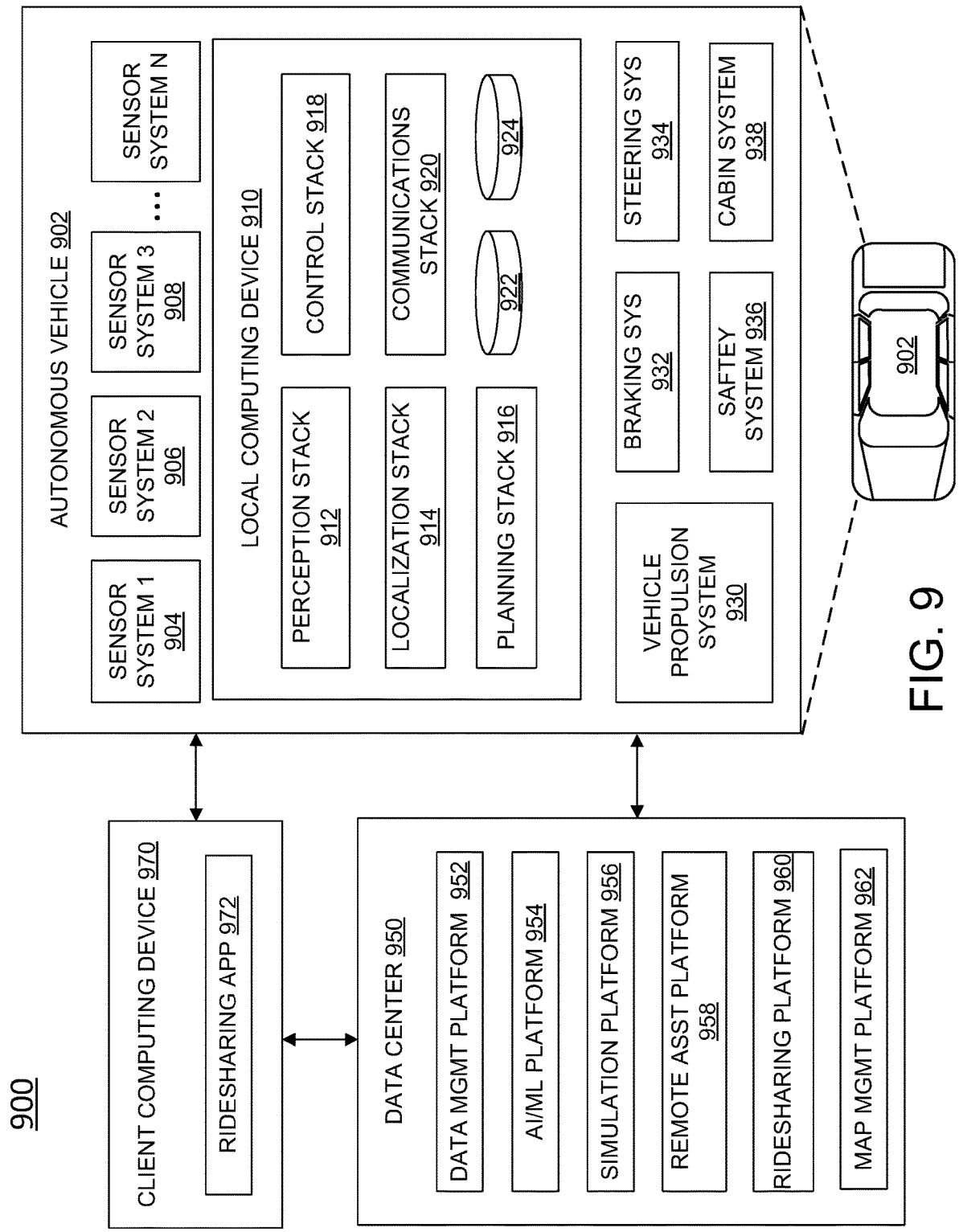
FIG. 9 illustrates an example system environment that can be used to facilitate AV dispatch and operations, according to some aspects of the disclosed technology.

Turning now to FIG. 9 illustrates an example of an AV management system 900. One of ordinary skill in the art will understand that, for the AV management system 900 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 900 includes an AV 902, a data center 950, and a client computing device 970. The AV 902, the data center 950, and the client computing device 970 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 902 can navigate about roadways without a human driver based on sensor signals generated by multiple sensor systems 904, 906, and 908. The sensor systems 904-908 can include different types of sensors and can be arranged about the AV 902. For instance, the sensor systems 904-908 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 904 can be a camera system, the sensor system 906 can be a LIDAR system, and the sensor system 908 can be a RADAR system. Other embodiments may include any other number and type of sensors.

AV 902 can also include several mechanical systems that can be used to maneuver or operate AV 902. For instance, the mechanical systems can include vehicle propulsion system 930, braking system 932, steering system 934, safety system 936, and cabin system 938, among other systems. Vehicle propulsion system 930 can include an electric motor, an internal combustion engine, or both. The braking system 932 can include an engine brake, brake pads, actuators, and/or any other suitable componentry configured to assist in decelerating AV 902. The steering system 934 can include suitable componentry configured to control the direction of movement of the AV 902 during navigation. Safety system 936 can include lights and signal indicators, a parking brake, airbags, and so forth. The cabin system 938 can include cabin temperature control systems, in-cabin entertainment systems, and so forth. In some embodiments, the AV 902 may not include human driver actuators (e.g., steering wheel, handbrake, foot brake pedal, foot accelerator pedal, turn signal lever, window wipers, etc.) for controlling the AV 902. Instead, the cabin system 938 can include one or more client interfaces (e.g., Graphical User Interfaces (GUIs), Voice User Interfaces (VUIs), etc.) for controlling certain aspects of the mechanical systems 930-938.

The AV 902 can additionally include a local computing device 910 that is in communication with the sensor systems 904-908, the mechanical systems 930-938, the data center 950, and the client computing device 970, among other systems. The local computing device 910 can include one or more processors and memory, including instructions that can be executed by the one or more processors. The instructions can make up one or more software stacks or components responsible for controlling the AV 902; communicating with the data center 950, the client computing device 970, and other systems; receiving inputs from riders, passengers, and other entities within the AV's environment; logging metrics collected by the sensor systems 904-908; and so forth. In this example, the local computing device 910 includes a perception stack 912, a mapping and localization stack 914, a planning stack 916, a control stack 918, a communications stack 920, an HD geospatial database 922, and an AV operational database 924, among other stacks and systems.

The perception stack 912 can enable the AV 902 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 904-908, the mapping and localization stack 914, the HD geospatial database 922, other components of the AV, and other data sources (e.g., the data center 950, the client computing device 970, third-party data sources, etc.). The perception stack 912 can detect and classify objects and determine their current and predicted locations, speeds, directions, and the like. In addition, the perception stack 912 can determine the free space around the AV 902 (e.g., to maintain a safe distance from other objects, change lanes, park the AV, etc.). The perception stack 912 can also identify environmental uncertainties, such as where to look for moving objects, flag areas that may be obscured or blocked from view, and so forth.

Mapping and localization stack 914 can determine the AV's position and orientation (pose) using different methods from multiple systems (e.g., GPS, IMUs, cameras, LIDAR, RADAR, ultrasonic sensors, the HD geospatial database 922, etc.). For example, in some embodiments, the AV 902 can compare sensor data captured in real-time by the sensor systems 904-908 to data in the HD geospatial database 922 to determine its precise (e.g., accurate to the order of a few centimeters or less) position and orientation. The AV 902 can focus its search based on sensor data from one or more first sensor systems (e.g., GPS) by matching sensor data from one or more second sensor systems (e.g., LIDAR). If the mapping and localization information from one system is unavailable, the AV 902 can use mapping and localization information from a redundant system and/or from remote data sources.

The planning stack 916 can determine how to maneuver or operate the AV 902 safely and efficiently in its environment. For example, the planning stack 916 can receive the location, speed, and direction of the AV 902, geospatial data, data regarding objects sharing the road with the AV 902 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 902 from one point to another. The planning stack 916 can determine multiple sets of one or more mechanical operations that the AV 902 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 916 can select from multiple backup plans to carry out. For example, while preparing to change lanes to turn right at an intersection, another vehicle may aggressively cut into the destination lane, making the lane change unsafe. The planning stack 916 could have already determined an alternative plan for such an event, and upon its occurrence, help to direct the AV 902 to go around the block instead of blocking a current lane while waiting for an opening to change lanes.

The control stack 918 can manage the operation of the vehicle propulsion system 930, the braking system 932, the steering system 934, the safety system 936, and the cabin system 938. The control stack 918 can receive sensor signals from the sensor systems 904-908 as well as communicate with other stacks or components of the local computing device 910 or a remote system (e.g., the data center 950) to effectuate operation of the AV 902. For example, the control stack 918 can implement the final path or actions from the multiple paths or actions provided by the planning stack 916. This can involve turning the routes and decisions from the planning stack 916 into commands for the actuators that control the AV's steering, throttle, brake, and drive unit.

The communication stack 920 can transmit and receive signals between the various stacks and other components of the AV 902 and between the AV 902, the data center 950, the client computing device 970, and other remote systems. The communication stack 920 can enable the local computing device 910 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 920 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 922 can store HD maps and related data of the streets upon which the AV 902 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 924 can store raw AV data generated by the sensor systems 904-908 and other components of the AV 902 and/or data received by the AV 902 from remote systems (e.g., the data center 950, the client computing device 970, etc.). In some embodiments, the raw AV data can include HD LIDAR point cloud data, image data, RADAR data, GPS data, and other sensor data that the data center 950 can use for creating or updating AV geospatial data as discussed further below with respect to FIG. 2 and elsewhere in the present disclosure.

The data center 950 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 950 can include one or more computing devices remote to the local computing device 910 for managing a fleet of AVs and AV-related services. For example, in addition to managing the AV 902, the data center 950 may also support a ridesharing service, a delivery service, a remote/roadside assistance service, street services (e.g., street mapping, street patrol, street cleaning, street metering, parking reservation, etc.), and the like.

The data center 950 can send and receive various signals to and from the AV 902 and client computing device 970. These signals can include sensor data captured by the sensor systems 904-908, roadside assistance requests, software updates, ridesharing pick-up and drop-off instructions, and so forth. In this example, the data center 950 includes a data management platform 952, an Artificial Intelligence/Machine Learning (AI/ML) platform 954, a simulation platform 956, a remote assistance platform 958, a ridesharing platform 960, and map management system platform 962, among other systems.

Data management platform 952 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 950 can access data stored by the data management platform 952 to provide their respective services.

The AI/ML platform 954 can provide the infrastructure for training and evaluating machine learning algorithms for operating the AV 902, the simulation platform 956, the remote assistance platform 958, the ridesharing platform 960, the map management system platform 962, and other platforms and systems. Using the AI/ML platform 954, data scientists can prepare data sets from the data management platform 952; select, design, and train machine learning models; evaluate, refine, and deploy the models; maintain, monitor, and retrain the models; and so on.

The simulation platform 956 can enable testing and validation of the algorithms, machine learning models, neural networks, and other development efforts for the AV 902, the remote assistance platform 958, the ridesharing platform 960, the map management system platform 962, and other platforms and systems. The simulation platform 956 can replicate a variety of driving environments and/or reproduce real-world scenarios from data captured by the AV 902, including rendering geospatial information and road infrastructure (e.g., streets, lanes, crosswalks, traffic lights, stop signs, etc.) obtained from the map management system platform 962; modeling the behavior of other vehicles, bicycles, pedestrians, and other dynamic elements; simulating inclement weather conditions, different traffic scenarios; and so on.

The remote assistance platform 958 can generate and transmit instructions regarding the operation of the AV 902. For example, in response to an output of the AI/ML platform 954 or other system of the data center 950, the remote assistance platform 958 can prepare instructions for one or more stacks or other components of the AV 902.

The ridesharing platform 960 can interact with a customer of a ridesharing service via a ridesharing application 972 executing on the client computing device 970. The client computing device 970 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 972. The client computing device 970 can be a customer's mobile computing device or a computing device integrated with the AV 902 (e.g., the local computing device 910). The ridesharing platform 960 can receive requests to be picked up or dropped off from the ridesharing application 972 and dispatch the AV 902 for the trip.

Map management system platform 962 can provide a set of tools for the manipulation and management of geographic and spatial (geospatial) and related attribute data. The data management platform 952 can receive LIDAR point cloud data, image data (e.g., still image, video, etc.), RADAR data, GPS data, and other sensor data (e.g., raw data) from one or more AVs 902, UAVs, satellites, third-party mapping services, and other sources of geospatially referenced data. The raw data can be processed, and map management system platform 962 can render base representations (e.g., tiles (2D), bounding volumes (3D), etc.) of the AV geospatial data to enable users to view, query, label, edit, and otherwise interact with the data. Map management system platform 962 can manage workflows and tasks for operating on the AV geospatial data. Map management system platform 962 can control access to the AV geospatial data, including granting or limiting access to the AV geospatial data based on user-based, role-based, group-based, task-based, and other attribute-based access control mechanisms. Map management system platform 962 can provide version control for the AV geospatial data, such as to track specific changes that (human or machine) map editors have made to the data and to revert changes when necessary. Map management system platform 962 can administer release management of the AV geospatial data, including distributing suitable iterations of the data to different users, computing devices, AVs, and other consumers of HD maps. Map management system platform 962 can provide analytics regarding the AV geospatial data and related data, such as to generate insights relating to the throughput and quality of mapping tasks.

In some embodiments, the map viewing services of map management system platform 962 can be modularized and deployed as part of one or more of the platforms and systems of the data center 950. For example, the AI/ML platform 954 may incorporate the map viewing services for visualizing the effectiveness of various object detection or object classification models, the simulation platform 956 may incorporate the map viewing services for recreating and visualizing certain driving scenarios, the remote assistance platform 958 may incorporate the map viewing services for replaying traffic incidents to facilitate and coordinate aid, the ridesharing platform 960 may incorporate the map viewing services into the client application 972 to enable passengers to view the AV 902 in transit en route to a pick-up or drop-off location, and so on.

Figure 10:
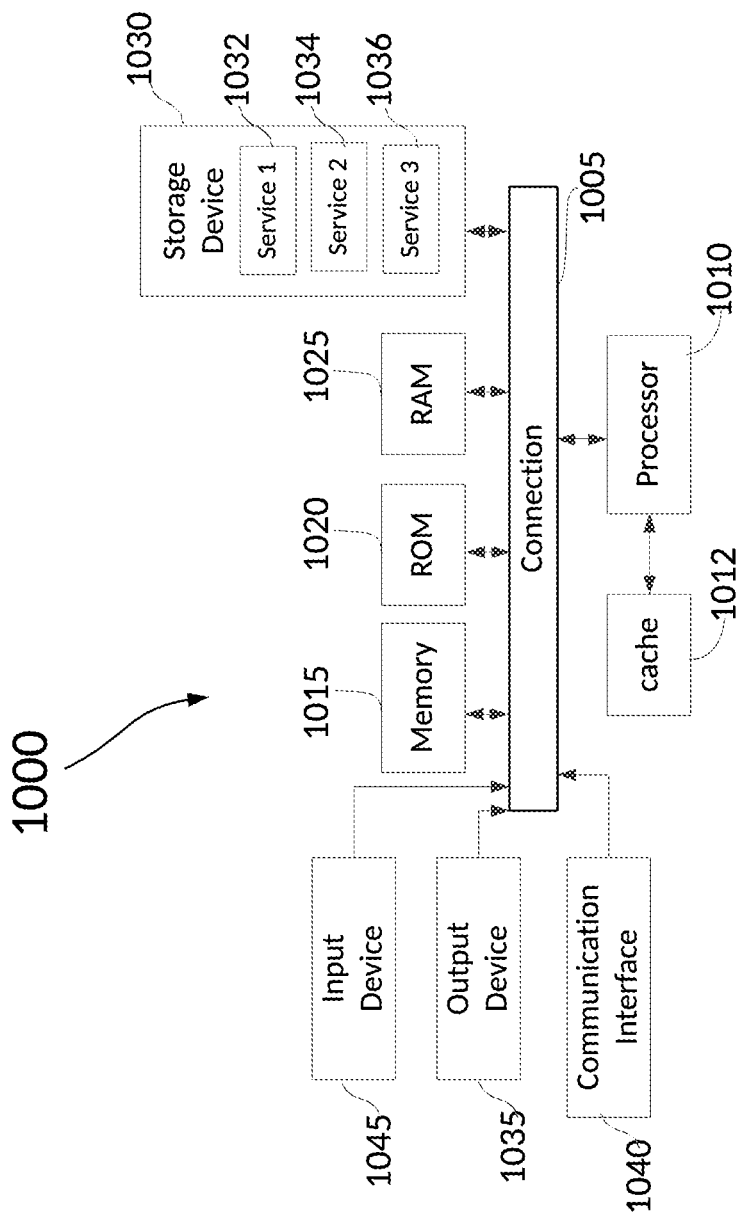
FIG. 10 illustrates an example processor-based system with which some aspects of the subject technology can be implemented.

FIG. 10 illustrates an example processor-based system with which some aspects of the subject technology can be implemented. For example, processor-based system 1000 can be any computing device making up internal computing system 610, remote computing system 650, a passenger device executing the rideshare app 670, internal computing device 1030, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; generative adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method of validating a digital map, comprising:
   receiving, by one or more processors and from a change detection database, change data indicating one or more feature discrepancies associated with one or more geographic regions of the digital map, wherein the change data comprises aggregated feature discrepancies received by the change detection database from one or more sources;
   analyzing, by the one or more processors, the change data, wherein the analyzing comprises:
      querying, by the one or more processors and from a semantic map service, historic map data associated with the one or more feature discrepancies and historic accuracy of changes associated with the historic map data;
      comparing, by the one or more processors, the one or more feature discrepancies to the historic map data to result in verified updates to be made to the digital map; and
      determining, by the one or more processors, a relevance score for each of the verified updates based on the historic accuracy of the changes associated with the historic map data; and
   generating, by the one or more processors, a quality score for each of the one or more geographic regions of the digital map based on the relevance score for each of the verified updates.

2. The computer-implemented method of claim 1, further comprising:
   calculating, by the one or more processors, an accuracy score for the digital map based on the quality score for each of the one or more geographic regions, wherein the accuracy score for the digital map indicates a need for additional change data from the one or more sources.

3. The computer-implemented method of claim 1, further comprising:
   estimating, by the one or more processors, a quality score for at least one geographic region based on the verified updates.

4. The computer-implemented method of claim 1, wherein the one or more feature discrepancies comprise one or more precision discrepancies.

5. The computer-implemented method of claim 1, wherein the one or more feature discrepancies comprise one or more accuracy discrepancies.

6. The computer-implemented method of claim 1, wherein the one or more feature discrepancies comprise one or more recall discrepancies.

7. The computer-implemented method of claim 1, wherein the change data comprises one or more of: a feature type, a location of a feature change, or a change type.

8. A system comprising:
   one or more processors; and a computer-readable medium comprising instructions stored therein, which when executed by the one or more processors, cause the system to perform operations comprising:

receiving, from a change detection database, change data indicating one or more feature discrepancies associated with one or more geographic regions of a digital map, wherein the change data comprises aggregated feature discrepancies received by the change detection database from one or more sources;

analyzing the change data, wherein the analyzing comprises:

querying, from a semantic map service, historic map data associated with the one or more feature discrepancies and historic accuracy of changes associated with the historic map data;

comparing the one or more feature discrepancies to the historic map data to result in verified updates to be made to the digital map; and determining a relevance score for each of the verified updates based on the historic accuracy of the changes associated with the historic map data; and generating a quality score for each of the one or more geographic regions of the digital map based on the relevance score for each of the verified updates.

9. The system of claim 8, wherein the instructions, when executed by the one or more processors, further cause the system to perform operations comprising:

calculating an accuracy score for the digital map based on the quality score for each of the one or more geographic regions, wherein the accuracy score for the digital map indicates a need for additional change data from the one or more sources.

10. The system of claim 8, wherein the instructions, when executed by the one or more processors, further cause the system to perform operations comprising:

estimating a quality score for at least one geographic region based on the verified updates.

11. The system of claim 8, wherein the one or more feature discrepancies comprise one or more precision discrepancies.

12. The system of claim 8, wherein the one or more feature discrepancies comprise one or more accuracy discrepancies.

13. The system of claim 8, wherein the one or more feature discrepancies comprise one or more recall discrepancies.

14. The system of claim 8, wherein the change data comprises one or more of: a feature type, a location of a feature change, or a change type.

15. A non-transitory computer-readable storage medium comprising instructions stored therein, which when executed by one or more processors, cause the one or more processors to perform operations comprising:

receiving, from a change detection database, change data indicating one or more feature discrepancies associated with one or more geographic regions of a digital map, wherein the change data comprises aggregated feature discrepancies received by the change detection database from one or more sources;

analyzing the change data, wherein the analyzing comprises:

querying, from a semantic map service, historic map data associated with the one or more feature discrepancies and historic accuracy of changes associated with the historic map data;

comparing the one or more feature discrepancies to the historic map data to result in verified updates to be made to the digital map; and determining a relevance score for each of the verified updates based on the historic accuracy of the changes associated with the historic map data; and generating a quality score for each of the one or more geographic regions of the digital map based on the relevance score for each of the verified updates.

16. The non-transitory computer-readable storage medium of claim 15, wherein the instructions, when executed by the one or more processors, further cause the one or more processors to perform operations comprising:

calculating an accuracy score for the digital map based on the quality score for each of the one or more geographic regions, wherein the accuracy score for the digital map indicates a need for additional change data from the one or more sources.

17. The non-transitory computer-readable storage medium of claim 15, wherein the instructions, when executed by the one or more processors, configured cause the one or more processors to perform operations comprising:

estimating a quality score for at least one geographic region based on the verified updates.

18. The non-transitory computer-readable storage medium of claim 15, wherein the one or more feature discrepancies comprise one or more precision discrepancies.

19. The non-transitory computer-readable storage medium of claim 15, wherein the one or more feature discrepancies comprise one or more accuracy discrepancies.

20. The non-transitory computer-readable storage medium of claim 15, wherein the one or more feature discrepancies comprise one or more recall discrepancies.

\* \* \* \* \*